(12) United States Patent
Thomas et al.

(10) Patent No.: US 8,321,468 B2
(45) Date of Patent: *Nov. 27, 2012

(54) WEB-BASED ASSET MANAGEMENT

(75) Inventors: Shawn Thomas, Austin, TX (US);
Gregory Gray, Austin, TX (US);
Michael Woodfin, Austin, TX (US);
Warner Mizell, Austin, TX (US); Brian Thomas, Austin, TX (US)

(73) Assignee: Caldvor Acquisitions Ltd., LLC, Dover, DE (US)

( * ) Notice: Subject to any disclaimer, the term of this patent is extended or adjusted under 35 U.S.C. 154(b) by 22 days.

This patent is subject to a terminal disclaimer.

(21) Appl. No.: 12/916,410

(22) Filed: Oct. 29, 2010

(65) Prior Publication Data

US 2011/0047170 A1 Feb. 24, 2011

Related U.S. Application Data

(63) Continuation of application No. 12/723,327, filed on Mar. 12, 2010, which is a continuation of application No. 10/464,176, filed on Jun. 18, 2003, now Pat. No. 7,765,181, which is a continuation of application No. 10/321,115, filed on Dec. 17, 2002, now Pat. No. 6,636,857.

(60) Provisional application No. 60/342,031, filed on Dec. 18, 2001.

(51) Int. Cl.
*G06F 17/30* (2006.01)
(52) U.S. Cl. ......... 707/802; 707/791; 717/173; 725/132
(58) Field of Classification Search .................. 707/791, 707/802; 717/173; 725/132
See application file for complete search history.

(56) References Cited

U.S. PATENT DOCUMENTS

| | | | |
|---|---|---|---|
| 4,558,413 A | 12/1985 | Schmidt et al. |
| 4,653,112 A | 3/1987 | Ouimette |
| 4,695,946 A | 9/1987 | Andreasen et al. |
| 4,714,995 A | 12/1987 | Materna et al. |
| 5,005,122 A | 4/1991 | Griffin et al. |
| 5,019,963 A | 5/1991 | Alderson et al. |
| 5,133,075 A | 7/1992 | Risch |

(Continued)

FOREIGN PATENT DOCUMENTS

CN 1204410 1/1999

(Continued)

OTHER PUBLICATIONS

"Advisory Action", U.S. Appl. No. 10/321,036, (Oct. 17, 2006), 3 pages.

(Continued)

*Primary Examiner* — Shahid Alam
(74) *Attorney, Agent, or Firm* — Perkins Coie LLP

(57) ABSTRACT

The method and system of the present invention provides an improved technique for replacing, implementing and managing computer-related assets. A technician accesses the World Wide Web through a user's computer. The information resident on the computer, including information regarding the computer and the user's preferences, are downloaded to a remote storage medium through the World Wide Web. Once downloaded, all information may be removed from the user's computer. Subsequently, the technician accesses another computer such as, for example, a new computer that has been assigned to the same user. The technician accesses the World Wide Web through the new computer and downloads the information previously stored on the remote storage medium. This information can then be used to install the user's prior applications, settings and preferences on the new computer.

28 Claims, 8 Drawing Sheets

U.S. PATENT DOCUMENTS

| | | |
|---|---|---|
| 5,155,847 A | 10/1992 | Kirouac et al. |
| 5,249,290 A | 9/1993 | Heizer |
| 5,278,982 A | 1/1994 | Daniels |
| 5,339,176 A | 8/1994 | Smilansky et al. |
| 5,355,498 A | 10/1994 | Provino |
| 5,414,843 A | 5/1995 | Nakamura et al. |
| 5,586,322 A | 12/1996 | Beck et al. |
| 5,673,382 A | 9/1997 | Cannon |
| 5,678,002 A | 10/1997 | Fawcett et al. |
| 5,752,244 A | 5/1998 | Rose et al. |
| 5,778,395 A | 7/1998 | Whiting et al. |
| 5,783,951 A | 7/1998 | Stein et al. |
| 5,784,578 A | 7/1998 | Galloway |
| 5,787,234 A | 7/1998 | Molloy |
| 5,787,491 A | 7/1998 | Merkin et al. |
| 5,793,951 A | 8/1998 | Stein et al. |
| 5,799,147 A | 8/1998 | Shannon |
| 5,819,020 A | 10/1998 | Beeler |
| 5,852,811 A | 12/1998 | Atkins |
| 5,864,828 A | 1/1999 | Atkins |
| 5,881,285 A | 3/1999 | DeLeeuw |
| 5,884,285 A | 3/1999 | Atkins |
| 5,893,904 A | 4/1999 | Harris et al. |
| 5,893,906 A | 4/1999 | Daffin et al. |
| 5,909,669 A | 6/1999 | Havens |
| 5,911,135 A | 6/1999 | Atkins |
| 5,911,136 A | 6/1999 | Atkins |
| 5,920,700 A | 7/1999 | Gordon et al. |
| 5,923,850 A | 7/1999 | Barroux |
| 5,930,342 A | 7/1999 | Mazzapica |
| 5,959,275 A | 9/1999 | Hughes et al. |
| 5,974,536 A | 10/1999 | Richardson |
| 5,974,563 A | 10/1999 | Beeler |
| 6,016,500 A | 1/2000 | Waldo et al. |
| 6,026,500 A | 2/2000 | Topff et al. |
| 6,038,551 A | 3/2000 | Barlow et al. |
| 6,038,665 A | 3/2000 | Bolt et al. |
| 6,049,784 A | 4/2000 | Weatherly et al. |
| 6,052,694 A | 4/2000 | Bromberg |
| 6,061,693 A | 5/2000 | Carney et al. |
| 6,108,641 A | 8/2000 | Kenna et al. |
| 6,110,229 A | 8/2000 | Yamaguchi |
| 6,118,447 A | 9/2000 | Harel |
| 6,127,661 A | 10/2000 | Fry |
| 6,128,661 A | 10/2000 | Flanagin et al. |
| 6,145,126 A | 11/2000 | Matsukura et al. |
| 6,161,176 A | 12/2000 | Hunter et al. |
| 6,181,336 B1 | 1/2001 | Chiu et al. |
| 6,182,212 B1 | 1/2001 | Atkins et al. |
| 6,182,226 B1 | 1/2001 | Reid et al. |
| 6,185,576 B1 | 2/2001 | McIntosh |
| 6,189,008 B1 | 2/2001 | Easty et al. |
| 6,212,280 B1 | 4/2001 | Howard et al. |
| 6,220,768 B1 | 4/2001 | Barroux |
| 6,230,287 B1 | 5/2001 | Pinard et al. |
| 6,237,009 B1 | 5/2001 | Waldo et al. |
| 6,237,617 B1 | 5/2001 | Sturman et al. |
| 6,252,694 B1 | 6/2001 | Shinada |
| 6,256,773 B1 | 7/2001 | Bowman-Amuah |
| 6,266,774 B1 | 7/2001 | Sampath et al. |
| 6,281,874 B1 | 8/2001 | Sivan et al. |
| 6,281,894 B1 | 8/2001 | Rive |
| 6,289,378 B1 | 9/2001 | Meyer et al. |
| 6,327,579 B1 | 12/2001 | Crawford |
| 6,327,617 B1 | 12/2001 | Fawcett |
| 6,330,566 B1 | 12/2001 | Durham |
| 6,351,776 B1 | 2/2002 | O'Brien et al. |
| 6,363,498 B1 | 3/2002 | Howell |
| 6,363,499 B1 | 3/2002 | Delo et al. |
| 6,366,916 B1 | 4/2002 | Baer |
| 6,370,646 B1 | 4/2002 | Goodman et al. |
| 6,373,416 B1 | 4/2002 | McGrath et al. |
| 6,373,434 B1 | 4/2002 | Hayakawa |
| 6,374,263 B1 | 4/2002 | Bunger et al. |
| 6,381,597 B1 | 4/2002 | Lin |
| 6,381,644 B2 | 4/2002 | Munguia et al. |
| 6,385,621 B1 | 5/2002 | Frisina |
| 6,385,707 B1 | 5/2002 | Maffezzoni |
| 6,411,936 B1 | 6/2002 | Sanders |
| 6,438,749 B1 | 8/2002 | Chamberlain |
| 6,473,794 B1 | 10/2002 | Guheen et al. |
| 6,490,587 B2 | 12/2002 | Easty |
| 6,499,049 B2 | 12/2002 | Waldo et al. |
| 6,502,096 B1 | 12/2002 | Siefert |
| 6,519,600 B1 | 2/2003 | Siefert |
| 6,532,543 B1 | 3/2003 | Smith et al. |
| 6,553,375 B1 | 4/2003 | Huang et al. |
| 6,557,008 B1 | 4/2003 | Temple, III et al. |
| 6,571,276 B1 | 5/2003 | Burns et al. |
| 6,574,522 B1 | 6/2003 | Douglas |
| 6,574,617 B1 | 6/2003 | Immerman et al. |
| 6,609,090 B1 | 8/2003 | Hickman et al. |
| 6,625,622 B1 | 9/2003 | Henrickson et al. |
| 6,633,977 B1 | 10/2003 | Hamilton, II et al. |
| 6,636,857 B2 | 10/2003 | Thomas et al. |
| 6,650,622 B1 | 11/2003 | Austerman et al. |
| 6,651,050 B2 | 11/2003 | Shafrir et al. |
| 6,654,802 B1 | 11/2003 | Oliva et al. |
| 6,662,357 B1 | 12/2003 | Bowman-Amuah |
| 6,691,064 B2 | 2/2004 | Vroman |
| 6,708,171 B1 | 3/2004 | Waldo et al. |
| 6,728,877 B2 | 4/2004 | Mackin et al. |
| 6,732,278 B2 | 5/2004 | Baird, III et al. |
| 6,754,696 B1 | 6/2004 | Kamath et al. |
| 6,782,394 B1 | 8/2004 | Landeck et al. |
| 6,829,734 B1 | 12/2004 | Kreulen et al. |
| 6,871,322 B2 | 3/2005 | Gusler et al. |
| 6,873,988 B2 | 3/2005 | Herrmann et al. |
| 6,882,961 B2 | 4/2005 | Cobble et al. |
| 6,901,416 B2 | 5/2005 | Tsai et al. |
| 7,080,372 B1 | 7/2006 | Cole |
| 7,110,353 B1 | 9/2006 | Deschaine et al. |
| 7,140,044 B2 | 11/2006 | Redlich et al. |
| 7,467,198 B2 | 12/2008 | Goodman et al. |
| 2001/0007128 A1 | 7/2001 | Lambert et al. |
| 2001/0012337 A1 | 8/2001 | Horie et al. |
| 2001/0026619 A1 | 10/2001 | Howard, Jr. et al. |
| 2001/0029474 A1 | 10/2001 | Yada |
| 2001/0037333 A1 | 11/2001 | Nishimura |
| 2001/0052013 A1 | 12/2001 | Munguia et al. |
| 2002/0010808 A1 | 1/2002 | Wiggins et al. |
| 2002/0010863 A1 | 1/2002 | Mankefors |
| 2002/0013807 A1 | 1/2002 | Richard |
| 2002/0038267 A1 | 3/2002 | Can et al. |
| 2002/0065736 A1 | 5/2002 | Willner et al. |
| 2002/0065825 A1 | 5/2002 | Kassan et al. |
| 2002/0073114 A1 | 6/2002 | Nicastro et al. |
| 2002/0082966 A1 | 6/2002 | O'Brien et al. |
| 2002/0082997 A1 | 6/2002 | Kobata et al. |
| 2002/0083102 A1 | 6/2002 | Vetter |
| 2002/0091699 A1 | 7/2002 | Norton |
| 2002/0091975 A1 | 7/2002 | Redlich et al. |
| 2002/0099934 A1 | 7/2002 | Cromer et al. |
| 2002/0103806 A1 | 8/2002 | Yamanoue |
| 2002/0104080 A1 | 8/2002 | Woodard et al. |
| 2002/0123983 A1 | 9/2002 | Riley et al. |
| 2002/0143421 A1 | 10/2002 | Wetzer |
| 2002/0143598 A1 | 10/2002 | Scheer |
| 2002/0143775 A1 | 10/2002 | Wilkinson |
| 2002/0143782 A1 | 10/2002 | Headings |
| 2002/0147601 A1 | 10/2002 | Fagan |
| 2002/0152151 A1 | 10/2002 | Baughman et al. |
| 2002/0152229 A1 | 10/2002 | Peng |
| 2002/0161600 A1 | 10/2002 | Stubiger et al. |
| 2002/0169714 A1 | 11/2002 | Ike et al. |
| 2002/0178364 A1 | 11/2002 | Weiss |
| 2002/0184619 A1 | 12/2002 | Meyerson |
| 2002/0184652 A1 | 12/2002 | Cezeaux |
| 2002/0194194 A1 | 12/2002 | Fenton et al. |
| 2002/0198997 A1 | 12/2002 | Linthicum |
| 2003/0004925 A1 | 1/2003 | Knoblock et al. |
| 2003/0009455 A1 | 1/2003 | Carlson |
| 2003/0009540 A1 | 1/2003 | Benfield et al. |
| 2003/0014508 A1 | 1/2003 | Cheston et al. |
| 2003/0018746 A1 | 1/2003 | Boesch |
| 2003/0046371 A1 | 3/2003 | Falkner |
| 2003/0055749 A1 | 3/2003 | Carmody et al. |

| | | | |
|---|---|---|---|
| 2003/0056140 A1 | 3/2003 | Taylor et al. | |
| 2003/0061159 A1 | 3/2003 | Adams et al. | |
| 2003/0079132 A1 | 4/2003 | Bryant | |
| 2003/0084067 A1 | 5/2003 | Obiaya | |
| 2003/0084460 A1 | 5/2003 | Chung et al. | |
| 2003/0093521 A1 | 5/2003 | Schlonski | |
| 2003/0093688 A1 | 5/2003 | Helgesen et al. | |
| 2003/0110169 A1 | 6/2003 | Zuili | |
| 2003/0120677 A1 | 6/2003 | Vernon | |
| 2003/0120684 A1 | 6/2003 | Zuili | |
| 2003/0126047 A1 | 7/2003 | Hollar et al. | |
| 2003/0126048 A1 | 7/2003 | Hollar et al. | |
| 2003/0130820 A1 | 7/2003 | Lane, III | |
| 2003/0139985 A1 | 7/2003 | Hollar et al. | |
| 2003/0140031 A1 | 7/2003 | Thomas et al. | |
| 2003/0140046 A1 | 7/2003 | Thomas et al. | |
| 2003/0140052 A1 | 7/2003 | Thomas et al. | |
| 2003/0140057 A1 | 7/2003 | Thomas et al. | |
| 2003/0140150 A1 | 7/2003 | Kemp | |
| 2003/0154199 A1 | 8/2003 | Thomas et al. | |
| 2003/0167323 A1 | 9/2003 | Motoyama | |
| 2003/0172020 A1 | 9/2003 | Davies et al. | |
| 2003/0182211 A1 | 9/2003 | Sakurazawa et al. | |
| 2003/0187758 A1 | 10/2003 | McKalko | |
| 2003/0195764 A1 | 10/2003 | Baker et al. | |
| 2003/0200274 A1 | 10/2003 | Henrickson et al. | |
| 2003/0200299 A1 | 10/2003 | Jamison, III | |
| 2003/0200304 A1 | 10/2003 | Thorpe et al. | |
| 2003/0216976 A1 | 11/2003 | Ehrman et al. | |
| 2003/0217042 A1 | 11/2003 | Thomas et al. | |
| 2003/0217062 A1 | 11/2003 | Thomas | |
| 2003/0225707 A1 | 12/2003 | Ehrman et al. | |
| 2003/0225927 A1 | 12/2003 | Goodman et al. | |
| 2003/0233287 A1 | 12/2003 | Sadler et al. | |
| 2003/0237022 A1 | 12/2003 | Thayer | |
| 2004/0001088 A1 | 1/2004 | Stancil et al. | |
| 2004/0012808 A1 | 1/2004 | Payne et al. | |
| 2004/0024657 A1 | 2/2004 | Wright et al. | |
| 2004/0044688 A1 | 3/2004 | Brudz | |
| 2004/0049578 A1 | 3/2004 | Ohara | |
| 2004/0143428 A1 | 7/2004 | Rappaport et al. | |
| 2005/0114468 A1 | 5/2005 | Philyaw | |
| 2008/0177753 A1 | 7/2008 | Thomas et al. | |
| 2010/0169981 A1 | 7/2010 | Thomas et al. | |
| 2012/0016962 A1 | 1/2012 | Thomas et al. | |

FOREIGN PATENT DOCUMENTS

| | | |
|---|---|---|
| EP | 0836140 | 4/1998 |
| EP | 0881567 | 12/1998 |
| EP | 1197886 | 4/2002 |
| EP | 1255196 | 6/2002 |
| EP | 1251656 | 10/2002 |
| GB | 2340273 | 2/2000 |
| JP | 03173273 | 6/2003 |
| WO | WO-9812656 | 3/1998 |
| WO | WO-9853396 | 11/1998 |
| WO | WO-0065438 | 11/2000 |
| WO | WO-0068816 | 11/2000 |
| WO | WO-0131482 | 5/2001 |
| WO | WO-0131494 | 5/2001 |
| WO | WO-0139030 | 5/2001 |
| WO | WO-0184274 | 11/2001 |
| WO | WO-0184278 | 11/2001 |
| WO | WO-0221274 | 3/2002 |
| WO | WO-0233631 | 4/2002 |
| WO | WO-02077764 | 10/2002 |
| WO | WO-02103548 | 12/2002 |
| WO | WO-03003163 | 1/2003 |
| WO | WO-03052600 | 1/2003 |
| WO | WO-03052560 | 2/2003 |
| WO | WO-03029922 | 4/2003 |
| WO | WO-03044718 | 5/2003 |
| WO | WO-03046681 | 6/2003 |
| WO | WO-03052228 | 6/2003 |
| WO | WO-03052557 | 6/2003 |
| WO | WO-03052558 | 6/2003 |
| WO | WO-03052559 | 6/2003 |
| WO | WO-03052601 | 6/2003 |
| WO | WO-03096179 | 11/2003 |
| WO | WO-03002555 | 12/2003 |
| WO | WO-2004001589 | 12/2003 |

OTHER PUBLICATIONS

"Advisory Action", U.S. Appl. No. 10/321,037, (Sep. 8, 2006), 3 pages.

"Advisory Action", U.S. Appl. No. 10/321,107, (Dec. 1, 2009), 2 pages.

"Effectively Managing Real-World Assets from IT", OPTO 22,(2000), pp. 1-7.

"Final Office Action", U.S. Appl. No. 12/056,969, (Jun. 24, 2010), 17 pages.

"Final Office Action", U.S. Appl. No. 10/321,037, (May 10, 2006), 7 pages.

"Final Office Action", U.S. Appl. No. 10/321,107, (Nov. 21, 2008), 9 pages.

"Final Office Action", U.S. Appl. No. 10/464,176, (Nov. 16, 2006), 26 pages.

"Final Office Action", U.S. Appl. No. 10/321,036, (Jul. 28, 2006), 12 pages.

"Final Office Action", U.S. Appl. No. 10/321,037, (Dec. 27, 2007), 8 pages.

"Final Office Action", U.S. Appl. No. 10/321,107, (Sep. 4, 2009), 11 pages.

"Final Office Action", U.S. Appl. No. 10/321,117, (Jan. 9, 2006), 8 pages.

"Final Office Action", U.S. Appl. No. 10/321,117, (Mar. 23, 2007), 10 pages.

"Final Office Action", U.S. Appl. No. 10/464,176, (Aug. 4, 2009), 8 pages.

"Foreign Notice of Rejection", Application Serial No. 02825256.X, Best Available Copy,(Feb. 13, 2009), 5 pages.

"Foreign Office Action", Application Serial No. 02827159.9, Best Available Copy,(Apr. 24, 2009), 10 pages.

"Foreign Office Action", Chinese Application No. 02825544.5, (Oct. 9, 2009), 10 Pages.

"Foreign Office Action", Chinese Application No. 02825544.5, (Mar. 22, 2010), 11 pages.

"Foreign Office Action", Chinese Application No. 02827159.9, (Jan. 29, 2010), 14 pages.

"Intelligent Asset Management", ASAP Software,(2003), 5 pages.

"Non Final Office Action", U.S. Appl. No. 10/321,036, (Feb. 10, 2006), 11 pages.

"Non Final Office Action", U.S. Appl. No. 12/056,969, (Aug. 25, 2009), 16 pages.

"Non-Final Office Action", U.S. Appl. No. 10/321,107, (Jan. 22, 2010), 10 pages.

"Non-Final Office Action", U.S. Appl. No. 12/056,969, (Feb. 22, 2010), 13 pages.

"Non-Final Office Action", U.S. Appl. No. 10/321,118, (Jul. 26, 2006), 8 pages.

"Non-Final Office Action", U.S. Appl. No. 10/321,036, (Sep. 15, 2005), 10 pages.

"Non-Final Office Action", U.S. Appl. No. 10/321,037, (Jan. 5, 2007), 7 pages.

"Non-Final Office Action", U.S. Appl. No. 10/321,037, (May 18, 2005), 6 pages.

"Non-Final Office Action", U.S. Appl. No. 10/321,037, (Sep. 19, 2007), 5 pages.

"Non-Final Office Action", U.S. Appl. No. 10/321,107, (Mar. 24, 2006), 7 pages.

"Non-Final Office Action", U.S. Appl. No. 10/321,107, (Mar. 17, 2009), 8 pages.

"Non-Final Office Action", U.S. Appl. No. 10/321,117, (Aug. 2, 2005), 7 pages.

"Non-Final Office Action", U.S. Appl. No. 10/321,117, (Oct. 2, 2006), 9 pages.

"Non-Final Office Action", U.S. Appl. No. 10/464,176, (Jan. 22, 2009), 6 pages.

"Non-Final Office Action", U.S. Appl. No. 10/464,176, (Jan. 21, 2004), 28 pages.

"Non-Final Office Action", U.S. Appl. No. 10/464,176, (Mar. 23, 2006), 25 pages.

"Notice of Allowance", U.S. Appl. No. 10/464,176, (Nov. 30, 2009), 10 pages.

"Patent Abstracts of Japan", Patent No. 03173273, (Jun. 26, 1991), 1 page.

"PCT International Preliminary Examination Report", Application No. PCT/US02/40820, (Sep. 11, 2004), 3 pages.

"PCT International Preliminary Examination Report", PCT/US02/40601, (Mar. 15, 2004), 3 pages.

"PCT International Search Report", PCT/US02/40601, (Nov. 24, 2003), 2 pages.

"PowerQuest Drive Image Professional v.2 User Guide", Power Quest Corporation Guide,(1998), pp. 15-44.

"Restriction Requirement", U.S. Appl. No. 10/464,176, (Jul. 15, 2008), 7 pages.

"The Windows Interface, An Application Design Guide", *Microsoft Press*, (1992), p. 4.

"TransLINK", http://web.archive.org/web/20020123004154/www.digital-assets.net/translink.html, http://web.archive.org/web/*/http://digital-assets.net—First archived link for digital-assets.,(Apr. 2001), 5 pages.

"Your complete life cycle management solution for managing on demand computing", Unicenter IT resource management—CA solutions,(2003), 11 pages.

Aguilar, Rautert "Business Process Simulation", *A Fundamental Step Supporting Process Centered Management*, (1999), pp. 1383-1392.

Blott, Stephen et al., "An Open Abstract Object Storage System", *Institute for information systems, ACM SIGMOD Record*, vol. 25, Issue 2, (Jun. 1996), pp. 330-340.

Codd, E.F. "A Relational Model of Data for Large Shared Data Banks", *Readings in Database Systems*, 3rd Edition, (1998), pp. 5-15.

Gaffney, John "Illustra's Web DataBlade Module", *An Illustra Technical White Paper, SIGMOD Record*, vol. 25, No. 1, Oakland, CA,(Mar. 1996), pp. 105-112.

Lubanski, Mike et al., "SMS 2 Administration", *New Riders Publishing*, Chapter 1, (2000), 6 pages.

Oppliger, Rolf "Security at the Internet Layer", *Federal Office of Information Technology and Systems* vol. 31, Issue 9, Available at <http://ieexplore.ieee.org>,(Sep. 1998), pp. 43-47.

Stroud, Emma "Managing Your Assets", *Interrnet World*, (May 1, 2001), 7 pages.

"Examiner's Answer to Appeal Brier", U.S. Appl. No. 10/321,107, (Nov. 5, 2010), 10 pages.

Decision on Appeal, U.S. Appl. No. 10/321,107 (Feb. 24, 2012), 6 pages.

Notice of Allowance, U.S. Appl. No. 10/321,107, (May 2, 2012), 6 pages.

Final Office Action, U.S. Appl. No. 12/056,969, (May 16, 2012), 14 pages.

Non-Final Office Action, U.S. Appl. No. 13/417,064, (May 24, 2012), 10 pages.

"Foreign Office Action", Chinese Application No. 02825256.X, (Jan. 24, 2007), 4 pages.

"Foreign Office Action", Chinese Application No. 02825256.X, (Jul. 11, 2008), 8 pages.

PCT International Search Report, PCT/US02/40820, (Sep. 18, 2003), 1 page.

PCT International Search Report, PCT/US02/40617, (Apr. 28, 2004), 1 page.

PCT Written Opinion, PCT/US02/40617, (Sep. 22, 2006), 4 pages.

PCT International Search Report, PCT/US2002/040816, (Jun. 24, 2003), 2 pages.

PCT International Preliminary Examination Report PCT/US2002/040816, (Jun. 18, 2004), 3 pages.

PCT Initial Publication with International Search Report PCT/US2002/040611, (Jun. 26, 2003), 13 pages.

PCT International Preliminary Examination Report, PCT/US2002/040611, (Aug. 16, 2004), 3 pages.

PCT Initial Publication with International Search Report, PCT/US2002/040817 (Jun. 26, 2003), 14 pages.

PCT International Preliminary Examination Report, PCT/US2002/040817, (Aug. 16, 2004), 3 pages.

"Non-Final Office Action", U.S. Appl. No. 12/723,327, (Dec. 27, 2010), 7 pages.

"Final Office Action", U.S. Appl. No. 12/723,327, (Jun. 9, 2011), 8 pages.

"Advisory Action", U.S. Appl. No. 12/723,327, (Aug. 17, 2011), 3 pages.

"Non-Final Office Action", U.S. Appl. No. 12/056,969 (Dec. 22, 2011), 22 pages.

Site Survey - Logistics for Abbeville

1) Site Contact name and phone number Please
2) Predominant spoken language at this site:  [English ▼]
3) Name and phone number of representative who performed the survey.
4) Work hours (times and time zone):
   a. Normal Business hours (M-F)
   b. Operational/Manufacturing Hours (e.g. 5x24, 7x24, etc.)
   c. Hours available for personnel (from/to)
   d. Security access requirements for vendor personnel:
5) Site dress code  [Business Casual ▼]
6) Site Safety Clothing and Equipment Requirements (please identify below each item whether Unisys workers need to provide for themselves).
   a. Hard Hats  [No ▼]
   b. Hard Sole, leather Shoes  [No ▼]

FIG. 4

Step 4 – Complete New Asset Information for mike woodfin – laptop

STOP You must choose Save or Next at the bottom of the page in order to save your information.

You can identify the type of workstation and any special needs you require. We will use this information during the ordering phase and also during PC deployment. If you have special requirements that the technicians should be aware of, please list them in the special needs box.

| Name | mike woodfin | Room Number | 4892 |
|---|---|---|---|
| Scheduled Install Date | 6/2/2002 | New Asset Number | GTRJP11 |
| New Asset Source | Purchase New ▼ | Asset Disposition | Remove from Desktop, dispose ▼ |
| New Workstation Type | Desktop ▼ | LAN Speed | 10BaseT ▼ |
| SDO Staging Server | Please Select ▼ | Static IP Address | 10.10.15.157 |
| Do you have any other special needs not address by this survey? | | | |
| Process Exceptions | N/A | | |

FIG. 8

WEB-BASED ASSET MANAGEMENT

RELATED APPLICATIONS

This application is a continuation of, claims priority to, and incorporates by reference in its entirety, co-pending U.S. patent application Ser. No. 12/723,327, filed Mar. 12, 2010. This application is also a continuation of, claims priority to, and incorporates by reference in its entirety, U.S. patent application Ser. No. 10/464,176, filed Jun. 18, 2003. This application is also a continuation of, claims priority to, and incorporates by reference in its entirety, U.S. patent application Ser. No. 10/321,115, filed Dec. 17, 2002, which is now U.S. Pat. No. 6,636,857, granted Oct. 21, 2003. Further, this application claims priority to and incorporates by reference U.S. Provisional Patent Application No. 60/342,031 filed on Dec. 18, 2001 entitled "Method and System for Deploying, Tracking and Managing Technology-Related Resources".

BACKGROUND

Computer-related technology is advancing at a remarkable rate. New technologies are being introduced daily that add new functionality or features to pre-existing technology. As these new technologies are introduced, the prices of devices that incorporate those technologies drop. As prices drop, more and more users are upgrading systems and adding new devices. Consequently, sales of computer-related devices are currently at an all-time high.

This trend most heavily impacts corporations with large investments in computer-related assets. However, the decision to upgrade to a new system is often only the beginning of the process. Once a new system has been selected and funds have been allocated for the acquisition, the questions remains of how best to replace, implement and manage the new assets. A poor or improper implementation can be extremely costly and disrupt an entire organization. Moreover, there is a strong trend in the industry currently towards paying fees for asset management on a per asset per month basis. Legacy systems are poorly equipped to accommodate such pricing models. A need exists, therefore, for an improved system and method for replacing, implementing and managing computer-related assets.

Existing systems and methods exist for replacing old computer-related assets. Typically, a computer technician would access the existing asset and make either handwritten notes of the user's setting and preferences or input the information into a computer and save it to a diskette. The technician would then download the information on the device's drive onto a portable medium. This process can take a considerable amount of time, is prone to technician error and results in a high labor cost due to the higher rates paid to computer technicians over general office laborers.

Existing methods are further limited because the information that is collected is not collected in such a manner that it can be compiled, managed and updated in the future. Under existing methods, once the computer technician re-installs the information on a new machine, he destroys any records that he may have kept relating, for example, to the specific versions of software installed, the serial number of the computer on which it was installed or the date of installation and, if the information is saved, it is usually not accessible in an organized, easily-accessible manner. Consequently, when the new machine is ready to be upgraded, relocated or decommissioned, the computer technician must start anew to gather information about it and the user's settings and preferences.

There is a need, therefore, for an improved method and system for replacing, implementing and managing computer-related assets.

SUMMARY

Various embodiments provide a method and system for replacing, implementing and managing computer-related assets. Embodiments provide a method of asset management in which a technician accesses the World Wide Web through a user's computer. The information resident on the computer, including information regarding the computer and the user's preferences, is downloaded to a remote storage medium through the World Wide Web. Once the information is downloaded, all information may be removed from the user's computer. Subsequently, the technician accesses another computer such as, for example, a new computer that has been assigned to the same user. The technician accesses the World Wide Web through the new computer and downloads the information previously stored on the remote storage medium. This information can then be used to install the user's prior applications, settings and preferences on the new computer.

Embodiments provide a method for asset management in which information that is downloaded from a user's computer at the time that a computer is installed or relocated is retained in a centralized database. Thereafter, the information can be accessed, modified and updated throughout the life of the computer.

BRIEF DESCRIPTION OF THE DRAWINGS

The disclosed embodiments will be described with reference to the accompanying drawings, which show important sample embodiments of the invention and which are incorporated in the specification hereof by reference, wherein:

FIG. 4 is a typical screen display used in the preferred method for asset management showing how a technician is prompted for location information;

FIG. 8 is a typical screen display used in the preferred method for asset management showing how a technician is prompted for new asset information.

DETAILED DESCRIPTION

The numerous innovative teachings of the present application will be described with particular reference to the present embodiments. However, it should be understood that these embodiments provide only a few examples of the many advantageous uses of the innovative teachings herein. In general, statements made in the specification of the present application do not necessarily delimit any of the various claimed embodiments. Moreover, some statements may apply to some inventive features, but not to others.

Figure 1A:
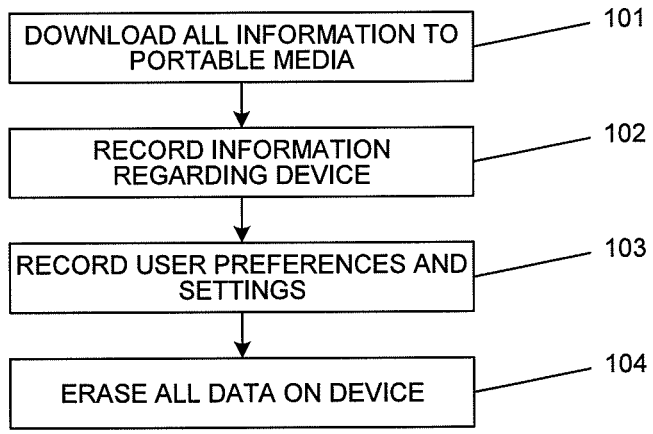
FIG. 1a is a flow diagram of a typical asset management workflow process at an original device.
Figure 1B:
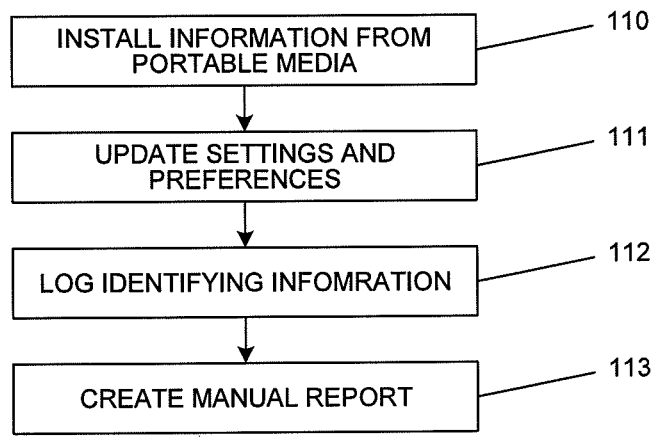
FIG. 1b is a flow diagram of a typical asset management workflow process at a new device.

A typical asset deployment work flow is illustrated in FIG. 1a and FIG. 1b. Referring to FIG. 1a, typically a technician would begin by accessing the original computer-related hardware device. He would download all data to portable media 101. For example, the technician may download all data to a CD-ROM, tape drive or another attached portable hard drive. Thereafter, the technician would perform a visual inspection of the device and record information concerning the device 102 obtained, including such information as the software applications installed on the machine, the serial number of the machine, the hardware attached to the machine, and other information concerning the type and nature of the user's equipment. The technician will next record user preferences and settings 103. This information may include the user's bookmarks, recorded passwords, and other information specific to the individual user. Once the information has been obtained and recorded, the technician will proceed to erase all data on the device 104. The original device is then ready for disposition.

Either the same or a new technician will be responsible for installing the user's information on a new device. Referring to FIG. 1b, the technician will begin by installing the information on the device from the portable media 110. Once the information has been installed, the technician will proceed to update the user's settings and preferences 111. The technician will then inspect the device to determine identifying information 112 such as the device's serial number and the software installed. Thereafter, the technician will create a manual report 113 of all activities related to the user's devices. The process undertaken by the technician is cumbersome due to the slow speeds at which data is transferred from the device to the portable media. In addition, the process is costly because an experienced computer technician is needed to transfer the files and update the user's settings and preferences. Moreover, there is a risk that the information stored on the portable media may be lost while being transported.

Figure 2A:
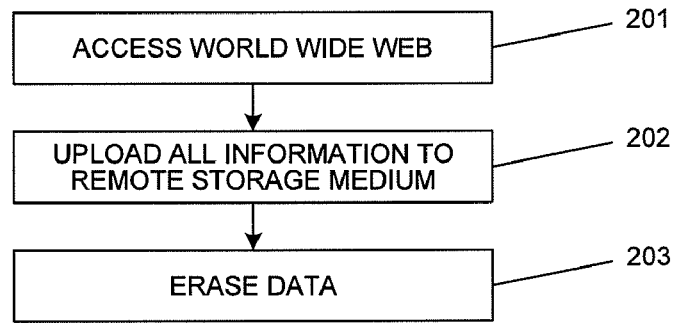
FIG. 2a is a workflow diagram showing the preferred method, at an original device, for asset management according to the present invention.
Figure 2B:
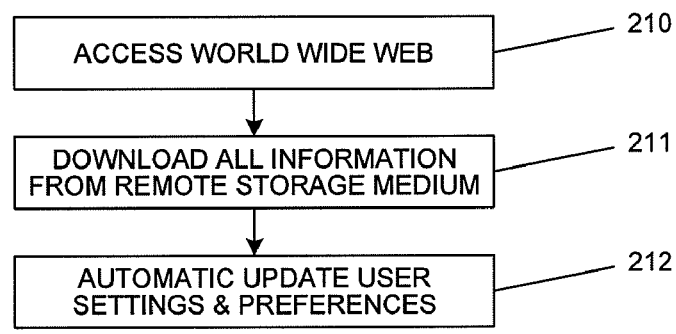
FIG. 2b is a workflow diagram showing the preferred method, at a new device, for asset management according to the present invention.

A method for asset management is shown in FIG. 2a and FIG. 2b. The work flow is a highly generalized overview of non-industry specific deployment and does not take into account such activities as future asset management, integration of disparate systems, data assimilation and the like, all of which may be performed as part of this invention. Referring to FIG. 2a, the method commences when a technician accesses the World Wide Web 201 through the user's computer-related hardware device such as a desktop computer, laptop computer, hand-held computer, printer, scanner, networking device or storage device. The technician can access the World Wide Web 201 through the internet, a local area network, or other methods known in the art. Once the technician has access to the World Wide Web, he proceeds to upload all information from the device to a remote storage medium 202. The information may be transferred through a secure, encrypted transmission so as to protect the confidentiality of the information. Additionally, the information may be converted to formatted data files prior to transmission for ease of storage and transfer. The information transferred contains information regarding the user's preferences and settings and the user's overall equipment configuration. Once the information has been uploaded by the technician, the technician can erase all data 203 residing on the device. The device may then be disposed of without further activity.

The same or a new technician can then install the information on the new device. Referring to FIG. 2b, the technician will proceed by first accessing the World Wide Web 210 to access the remote storage medium on which the user's information is stored. The information may be stored on the remote storage medium in a database, such as a relational database. In addition, the technician will next download all information relating to the user from the remote storage medium 211. This process may include, for example, a filter so that unwanted or redundant files will not be transferred. Once the information has been downloaded to the new device the system can automatically update user settings and preferences 212.

The improved process described in FIG. 2a and FIG. 2b have a number of advantages over the prior art. For example, the transfer of information occurs rapidly so that the transfer of data to the new device can occur on a real time basis. In addition, because the information is held in electronic form, a wide variety of reports can be generated relating to the information resident on the user's computer. Also, because software is being installed electronically, a means exists for monitoring, updating and controlling versions of software resident on the device. Another benefit is the ability to translate information being transmitted between devices into a common language.

It will be understood by those skilled in the art that certain information regarding a user's settings, preferences or equipment may not be included within the information transmitted to the remote storage medium and therefore may not be available to update the new device. In such cases, it is anticipated that, as part of the present invention, a combination of the foregoing Web-based asset management and traditional techniques for updating user's settings, preferences and equipment list would be used. For example, when information is downloaded from the remote storage medium 211, a method may be employed whereby the device assesses what information it requires has not been downloaded. Thereafter, the device would be programmed to prompt the user to provide such information.

Figure 3:
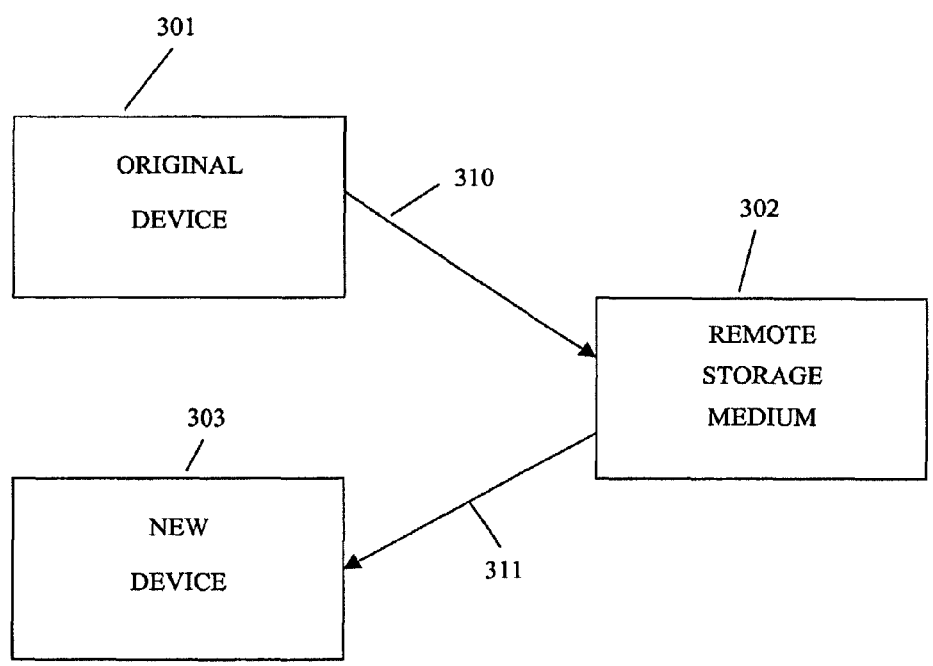
FIG. 3 is a system diagram showing the preferred system for asset management.

A system for Web-based asset management is shown in FIG. 3. The system preferably comprises an original device 301, a remote storage medium 302 and a new device 303. The original device 301 and the new device 303 both have access to the World Wide Web. The system described herein provides a means for transferring information from the original device through the World Wide Web to a remote storage medium 310. In addition, the system provides a means 311 for transferring information from the remote storage medium to a new device through the World Wide Web. As has been previously described, the transfer of information from the original device through the remote storage medium to the new device is completed once the user's preferences and profile settings have been completed.

FIG. 4 depicts a meeting display showing how a technician may be prompted to input information regarding the location in which the equipment exists. Basic information is included on the form such as, for example, site contact and phone number, language predominantly spoken at the site, and the name of the representative who performed the survey. The input of this information provides a valuable resource within the overall method and system because future users can refer back to the information when subsequent visits are planned.

Figure 5:
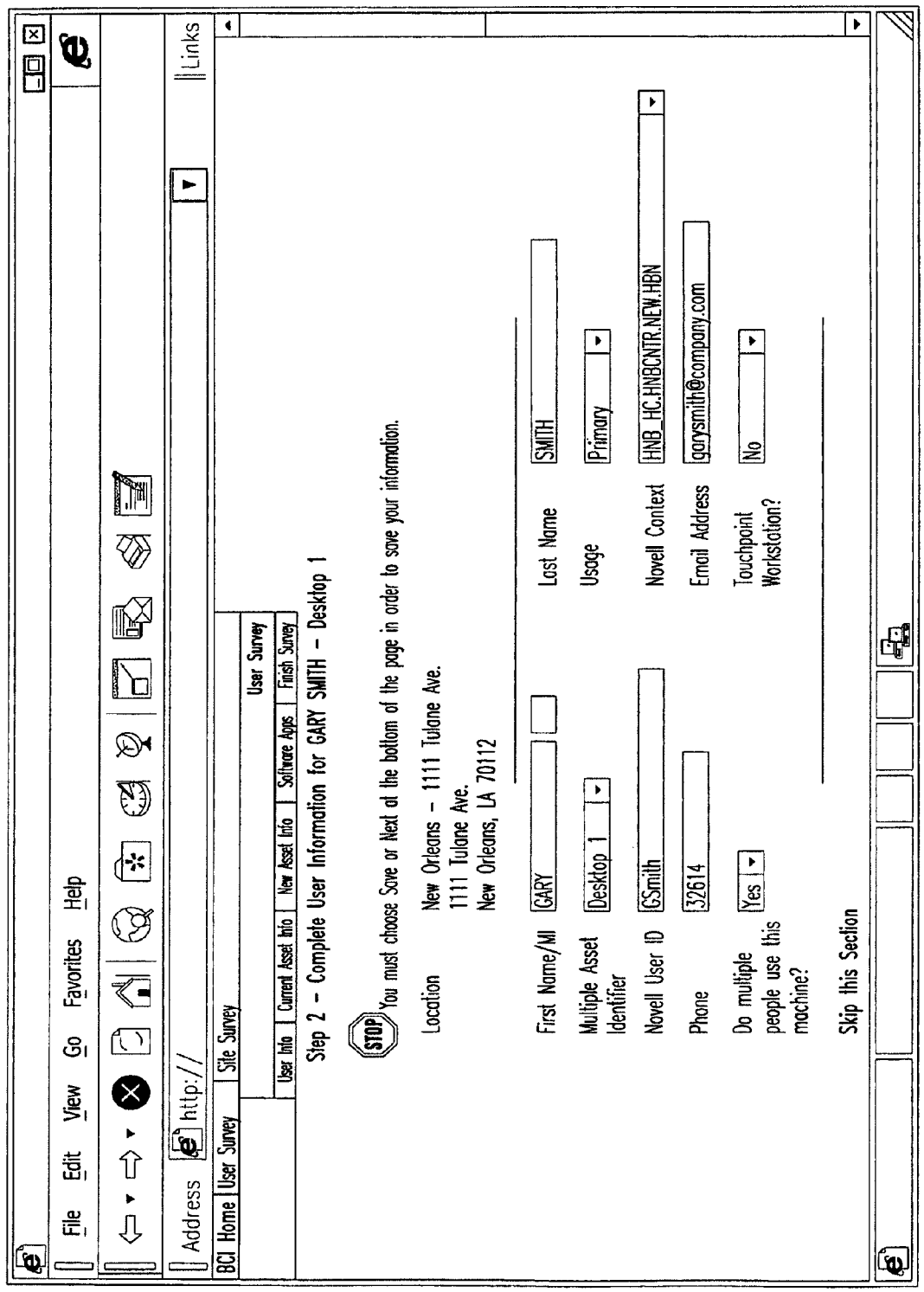
FIG. 5 is a typical screen display used in the preferred method for asset management showing how a technician is prompted for user information.

FIG. 5 presents a screen display showing how a technician may be prompted to input information regarding the device's user. The information to be input will include such information as first name, last name, user ID and email address. This information can be used by the system for validating the user's name and access authority.

Figure 6:
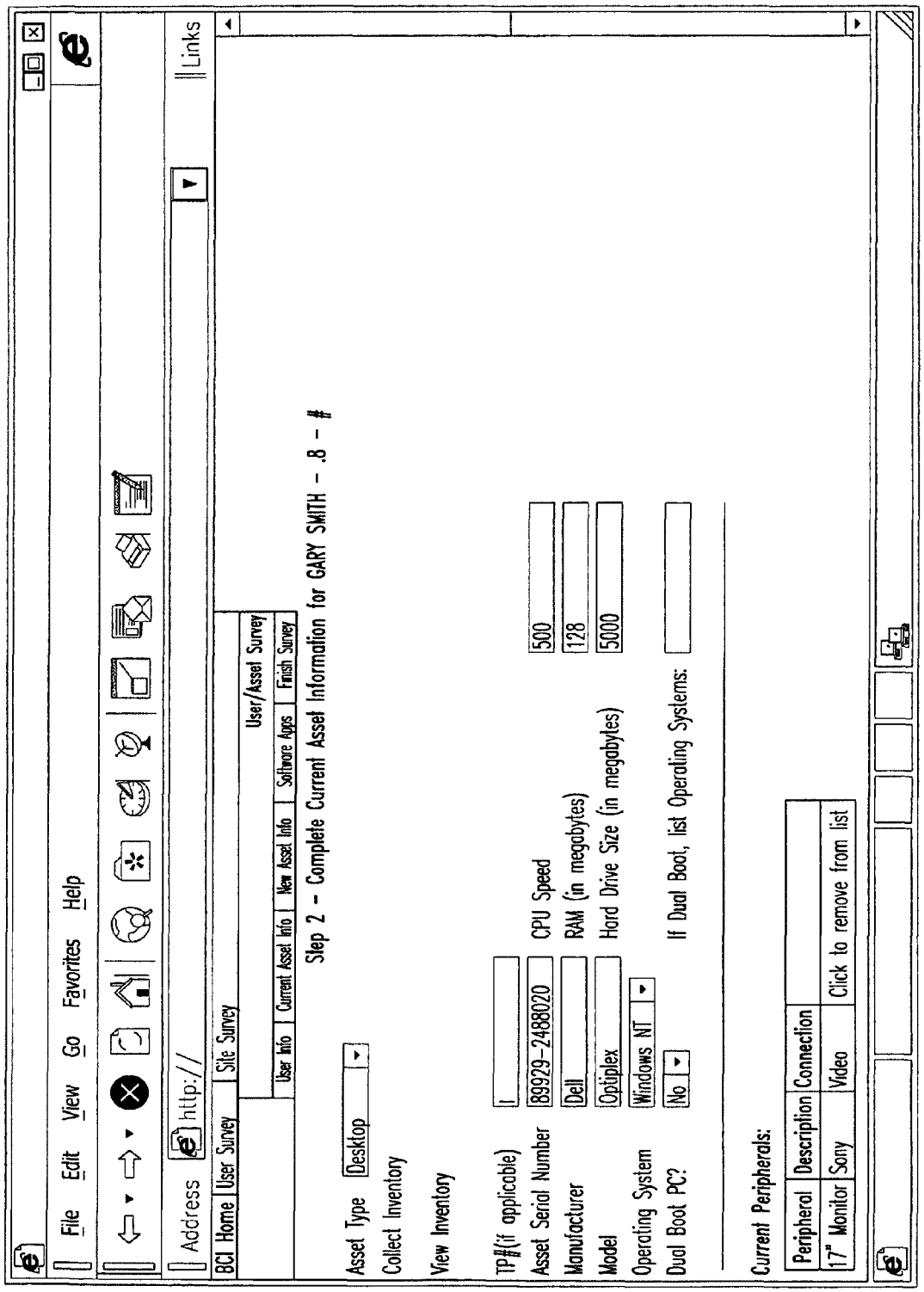
FIG. 6 is a typical screen display used in the preferred method for asset management showing how a technician is prompted for legacy asset information.

FIG. 6 depicts a screen display that may be accessed by the technician for the purpose of inputting legacy asset information. The screen display prompts the technician to input such information as the asset type, manufacturer, model, serial number and peripherals. This information is critical to the system for the future configuration of the user's devices.

Figure 7:
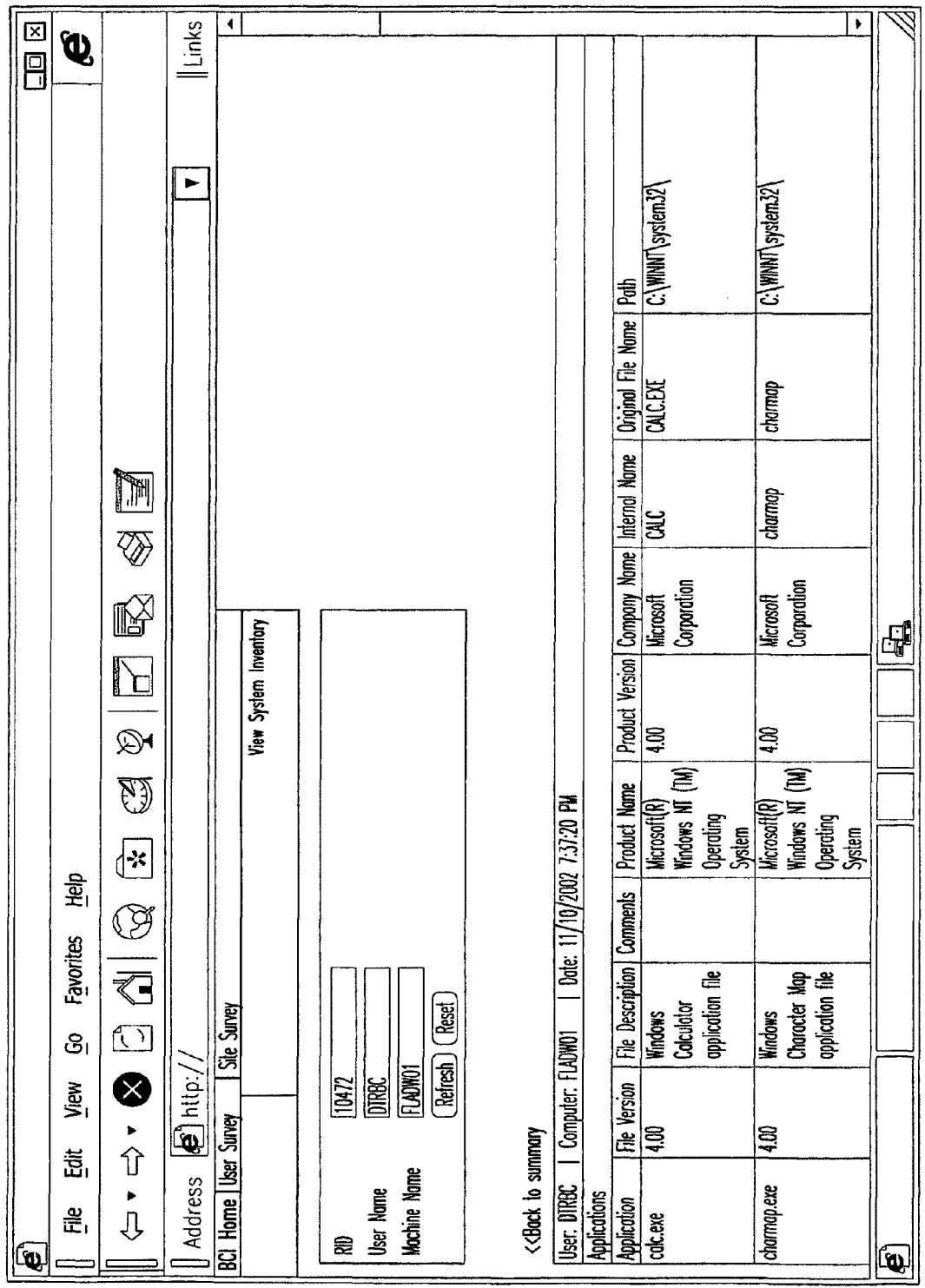
FIG. 7 is a typical screen display used in the preferred method for asset management showing how a technician is prompted for application information.

FIG. 7 shows a screen display that may be used to prompt a technician to input information regarding the existing applications on a user's device. The display will first prompt a technician to input a user name and the machine name. The program will then automatically discover the applications on the device, a procedure which is known in the art. Once the information is obtained, it is combined with the user name and machine name previously entered.

FIG. 8 provides a depiction of a screen display in which a technician may be prompted to input information regarding the new asset. Information that may be requested includes the scheduled installation date, the new asset source, the new work station type and the location of the new asset.

The invention claimed is:

1. A method for asset management utilizing the World Wide Web, the method comprising:
receiving information from at least one first computer-related hardware device through the World Wide Web at a storage medium that is remote from the first computer-related hardware device;
transferring the information from the storage medium to a second computer-related hardware device;
defining configuration settings on the second computer-related hardware device based on the information from the at least one first computer-related hardware device;
determining if any of the configuration settings are not specified by the information; and
in response to determining that at least one of the configuration settings is not specified by the information, prompting a user to define the at least one configuration setting that is not specified by the information.

2. The method of claim 1, wherein receiving information includes receiving information from at least one first computer-related hardware device that is selected from the group consisting of desktop computers, laptop computers, handheld computers, printers, scanners, networking devices and storage devices.

3. The method of claim 1, further comprising converting the information to formatted data files prior to transferring the information to the second computer-related hardware device.

4. The method of claim 1, further comprising storing the information on the storage medium in a relational database.

5. The method of claim 1, wherein said defining configuration settings on the second computer-related hardware device occurs on a real-time basis.

6. The method of claim 1, further comprising generating a report of the information after defining configuration setting on the second computer-related hardware device based on the information.

7. The method of claim 1, wherein transferring the information from the storage medium includes filtering at least a portion of the information.

8. The method of claim 1, further comprising remotely monitoring, updating, and controlling versions of software resident on the second computer-related hardware device.

9. The method of claim 1, further comprising translating the information.

10. A system for asset management utilizing the World Wide Web, the system comprising:
a first computer-related hardware device associated with a user, the first computer-related hardware device being configured to access the World Wide Web;
at least one second computer-related hardware device configured to be associated with the user and to access the World Wide Web;
means for transferring information from the first computer-related hardware device through the World Wide Web to a remote storage medium;
means for transferring at least a portion of the information from the remote storage medium to the at least one second computer-related hardware device; and
means for defining user settings on the at least one second computer-related hardware device based on at least a portion of the information from the first computer-related hardware device, assessing if any of the user settings were not specified by the information, and for prompting a user to define at least one user setting that is not specified by the information, in response to determining that at least one of the user settings is not specified by the information.

11. The system of claim 10, wherein the first computer-related hardware device is selected from the group consisting of desktop computers, laptop computers, handheld computers, printers, scanners, networking devices and storage devices.

12. The system of claim 10, wherein the first computer-related hardware device and the at least one second computer-related hardware device are configured to access the World Wide Web over the Internet.

13. The system of claim 11, wherein the first computer-related hardware device and the at least one second computer-related hardware device are configured to access the World Wide Web utilizing secure, encrypted transmission.

14. The system of claim 10, wherein the first computer-related hardware device and the at least one second computer-related hardware device are configured to access the World Wide Web through a local area network.

15. The system of claim 10, wherein the means for transferring information further comprises means for converting the information to formatted data files prior to transferring the information from the first computer-related hardware device through the World Wide Web to the remote storage medium.

16. The system of claim 10, wherein the remote storage medium comprises a relational database configured to store said information.

17. The system of claim 10, wherein said means for defining user settings on the at least one second computer-related hardware device occurs on a real-time basis.

18. The system of claim 10, wherein the system further includes means for generating a report of the information after the user settings on the at least one second computer-related hardware device have been defined.

19. The system of claim 10, wherein the means for transferring information from the first computer-related hardware device through the World Wide Web to the remote storage medium includes means for filtering unwanted or redundant information.

20. A method for asset management using the World Wide Web, the method comprising:
receiving respective information regarding a plurality of computer-related hardware devices at a storage medium that is remote from the plurality of computer-related hardware devices;
deriving respective further information related to the plurality of computer-related hardware devices from the respective information residing on the storage medium;

defining configuration settings on at least one further computer-related hardware device that is to be associated with a user based on the respective information or the respective further information from at least one of the plurality of computer-related hardware devices;

determining if any of the configuration settings are not specified by the information; and in response to determining that at least one of the configuration settings is not specified by the information, prompting a user to define the at least one configuration setting that is not specified by the information.

21. The method of claim 20, wherein receiving respective information includes receiving the respective information from the plurality of computer-related hardware devices that are selected from the group consisting of: desktop computers, laptop computers, handheld computers, printers, scanners, networking devices and storage devices.

22. The method of claim 20, further comprising preparing and disseminating reports compiled from the respective further information.

23. The method of claim 20, further comprising transferring the respective information or the respective further information from the storage medium to the at least one further computer-related hardware device.

24. The method of claim 23, further comprising converting the respective information or the respective further information to formatted data files prior to transferring the respective information or the respective further information to the at least one further computer-related hardware device.

25. The method of claim 20, further comprising storing the respective information or the respective further information on the storage medium in a relational database.

26. The method of claim 20, further comprising receiving updates to the respective information on a real-time basis.

27. The method of claim 20, further comprising filtering at least a portion of the respective information or the respective further information.

28. The method of claim 20, further comprising monitoring, updating, and controlling versions of software resident on the at least one further computer-related hardware device.

* * * * *

UNITED STATES PATENT AND TRADEMARK OFFICE
CERTIFICATE OF CORRECTION

PATENT NO.        : 8,321,468 B2
APPLICATION NO.   : 12/916410
DATED             : November 27, 2012
INVENTOR(S)       : Thomas et al.

Page 1 of 1

It is certified that error appears in the above-identified patent and that said Letters Patent is hereby corrected as shown below:

On Title Page 4, item (56), under "OTHER PUBLICATIONS", in Column 1,
Lines 13-14, delete "Power Quest" and insert -- PowerQuest --, therefor.

On Title Page 4, item (56), under "OTHER PUBLICATIONS", in Column 1,
Line 41, delete "Systems" and insert -- Systems, --, therefor.

On Title Page 4, item (56), under "OTHER PUBLICATIONS", in Column 2,
Line 1, delete "Interrnet" and insert -- Internet --, therefor.

On Title Page 4, item (56), under "OTHER PUBLICATIONS", in Column 2,
Line 3, delete "Brier"," and insert -- Brief', --, therefor.

In the Specification:

In Column 3, Line 8, delete "asset deployment" and insert -- asset management --, therefor.

In Column 3, Line 54, delete "hand-held" and insert -- handheld --, therefor.

Signed and Sealed this
Fourth Day of June, 2013

Teresa Stanek Rea
*Acting Director of the United States Patent and Trademark Office*